(12) United States Patent
Kurose et al.

(10) Patent No.: US 6,610,816 B2
(45) Date of Patent: Aug. 26, 2003

(54) PROCESS FOR PRODUCTION OF POLYAMIDE

(75) Inventors: Hideyuki Kurose, Niigata (JP); Kazumi Tanaka, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/020,199

(22) Filed: Dec. 18, 2001

(65) Prior Publication Data

US 2002/0082383 A1 Jun. 27, 2002

(30) Foreign Application Priority Data

Dec. 22, 2000 (JP) ........................................ 2000-390293

(51) Int. Cl.[7] .............................................. C08G 69/04
(52) U.S. Cl. ..................... 528/310; 528/312; 528/313; 528/332; 528/335; 528/336; 528/337; 528/338; 528/339; 528/340; 528/347
(58) Field of Search .................. 528/310, 340, 528/312, 336, 313, 335, 337, 339, 332, 338, 347

(56) References Cited

U.S. PATENT DOCUMENTS

| 5,339,255 A | * | 8/1994 | Suzuki et al. ............... 700/269 |
| 5,416,189 A | * | 5/1995 | Vandevijver et al. ........ 528/347 |
| 5,532,487 A | * | 7/1996 | Brearley et al. ........ 250/339.12 |
| 5,576,415 A | * | 11/1996 | Tanaka ........................ 528/310 |
| 5,674,974 A | | 10/1997 | Brearley et al. ............ 528/340 |

FOREIGN PATENT DOCUMENTS

| FR | 2 794 760 | 12/2000 |
| WO | 00/77075 A1 | 12/2000 |

* cited by examiner

Primary Examiner—P. Hampton-Hightower
(74) Attorney, Agent, or Firm—Antonelli, Terry, Stout & Kraus, LLP

(57) ABSTRACT

In the production of polyamide by the melt-polymerization of the present invention, the polymerization conditions are rapidly and accurately controlled by a near-infrared spectroscopy to enable the efficient production of a desired polyamide with a good stability in its quality.

32 Claims, 3 Drawing Sheets

PROCESS FOR PRODUCTION OF POLYAMIDE

BACKGROUND OF THE INVENTION

1. Field of the Invention

The present invention relates to a process for producing polyamides which are useful as molding materials or packaging materials. More particularly, the invention relates to a process for the production of polyamides by melt-polymerization, which is capable of providing a desired polyamide at a high efficiency with batch-to-batch stability in quality. In the process, the molar ratio of a diamine component (total of the monomer remaining not polymerized and the monomer polymerized to constitute the polyamide) and a dicarboxylic acid component (total of the monomer remaining not polymerized and the monomer polymerized to constitute the polyamide) in a reaction mixture (hereinafter occasionally referred to merely as "molar ratio" or "charged molar ratio") and physical properties such as molecular weight are rapidly measured by a near-infrared spectrometer during the polymerization operation, and the molar ratio and the physical properties are automatically and rapidly controlled on the basis of the obtained results of the near-infrared measurements.

2. Description of the Prior Art

Polyamide have been generally produced by a dehydration polycondensation of a diamine monomer and a dicarboxylic acid monomer. Of the polycondensation methods, usually employed is a melt-polymerization method which is conducted at a temperature not less than the melting point of the polyamide being produced. In this production method, it is important to maintain reaction conditions such as a molar ratio of monomers and a reaction time at setpoints in order to ensure the production of polyamides with batch-to-batch uniformity and stability in their quality. Therefore, various techniques have been employed to maintain the reaction conditions such as a molar ratio of monomers, a reaction time, a reaction temperature and a reaction pressure at setpoints.

However, it is usually difficult to constantly maintain the reaction conditions at the setpoints since the reaction conditions are varied depending on the performance of a reactor and the internal and external factors. Therefore, the change with time of some properties of polyamide such as molar ratio, molecular weight, relative viscosity and melt viscosity is measured during the polymerization process in order to adequately control the polymerization reaction as well as in order to accurately determine the timing for changing the polymerization conditions and the end point of the polymerization reaction.

Hitherto, the properties of polyamide during the polymerization process have been measured by several different analyzing methods. For instance, the number-average molecular weight of polyamide is calculated from a carboxyl end group concentration and an amino end group concentration thereof which are measured by a neutralization titration of a solution of the polyamide in a specific solvent. The relative viscosity of the polyamide is determined by comparing the dropping speed by second of a solution of the polyamide in a concentrated sulfuric acid with that of only the concentrated sulfuric acid, each dropping speed being measured by using a viscometer.

For measuring the properties of polyamide with the passage of time during the polymerization process by the above analyzing methods, sampling of a reaction mixture from a melt-polymerization apparatus is inevitably required. The sampling procedure, however, is not an appropriate method, because it is time-consuming, it requires a plurality of sampling numbers, and it is one of the external factors which disturb the polymerization process. In addition, the time required until obtaining the results of the analysis from the sampling is usually 2–4 hours or longer. Therefore, the real-time measurement of properties of polyamide during the polymerization process is actually impossible, thereby failing to rapidly control the polymerization.

When the melt-polymerization is further continued in another melt-polymerization apparatus, it is necessary to know the properties of the polyamide produced in the previous melt-polymerization apparatus. However, only the viscosity data have been hitherto available. A melt-polymerized polymer is generally subjected to a solid-polymerization to increase its molecular weight. To adequately determine the solid-polymerization conditions, the properties of the melt-polymerized polymer are necessary to be known. However, the melt-polymerized polymer should be stored in a silo, etc. until the results of the analysis are obtained, thereby reducing the production efficiency.

Japanese Patent Publication No. 48-36957 proposes to use a viscometer for a real-time measurement of properties of polyamide during the continuous polymerization process. However, in this method, only a melt viscosity is measured by the viscometer and the other properties such as molar ratio of charged monomers and end group concentrations cannot be measured, resulting in insufficient control of the polymerization.

In recent years, there has been proposed an on-line measurement of the properties of polyesters, etc. using a near-infrared spectrometer during the production thereof. Near-infrared radiation is more permeable as compared to ultraviolet radiation and infrared radiation, and therefore, very suitable for non-destructive analysis and real-time analysis. However, the near-infrared spectroscopy was not hitherto put into practice because of various problems in the stability of light source, the spectroscopic system, the detector, and the hardware and software of computers for processing spectral data. With recent development of related techniques, near-infrared spectrometers solved in many of these problems have become commercially available.

Each of Japanese Patent Applications Laid-Open Nos. 2-306937, 10-182802, 11-60711 and 11-315137 discloses to measure various properties of polyester using a near-infrared spectrometer during the production thereof, and to control the polymerization conditions on the basis of the measured values. However, none of these prior art references describe or discuss a process for controlling the polymerization conditions for producing high molecular weight polyamides by measuring properties of polyamide using a near-infrared spectrometer during its production.

Japanese Patent Application Laid-Open No. 6-322054 discloses a process for controlling the production of phenol resins by using a near-infrared spectrometer to measure the amounts of the compositions in a reaction system and carrying out the reaction while monitoring the degree of progress of the reaction on the basis of the measured results. However, this prior art reference also fail to describe or discuss a method of controlling polymerization conditions for the production of polyamide.

U.S. Pat. No. 5,573,952 discloses a process for measuring the concentration of a solution comprising an amide solvent and aramid polymers using a near-infrared spectrometer to adjust the amount of the solvent. However, the polymerization disclosed therein is solution polymerization, and nothing is described or discussed therein about the measurement in a melt-polymerization process. In addition, in the proposed process, only the polymer concentration in the solution is measured, and there is no teaching about the measurement of properties of polyamide itself.

U.S. Pat. No. 5,674,974 discloses a continuous process for the production of polyamides by melt-polymerization and a process control method using a near-infrared spectrometer. In the proposed process, the carboxyl end group concentration and the amino end group concentration are measured, and the balance thereof is controlled by varying the feed amount of diamine on the basis of the measured results, thereby producing an aimed polyamide and preventing formation of solids in a polymerization apparatus.

However, the measurement using the near-infrared spectrometer actually taught therein is limited only to the production of polyamide from adipic acid and hexamethylenediamine, and there is no description and discussion therein about the measurement using the near-infrared spectrometer in the production of polyamide from other diamines, e.g., xylylenediamine and bisaminomethylcyclohexane. U.S. Pat. No. 5,674,974 further fails to teach or describe a process for increasing the molecular weight in another polymerization apparatus after melt-polymerization.

Also, U.S. Pat. No. 5,674,974 relates only to a continuous melt-polymerization conducted in a specific multi-stage reactor using a near-infrared spectrometer, and describes nothing about a batch-wise melt-polymerization. In addition, the patent is completely silent about the direct near-infrared measurement of properties other than the end group concentrations of polyamide, e.g., molar ratio of monomers, molecular weight, relative viscosity and melt viscosity.

SUMMARY OF THE INVENTION

An object of the present invention is to provide a process for producing a high-molecular polyamide with a batch-to-batch stability in its quality at a high production efficiency by rapidly measuring (A) a molar ratio of a charged diamine monomer and a charged dicarboxylic acid monomer in a reaction mixture, and (B) at least one property selected from the group consisting of a water content of the reaction mixture, and a carboxyl end group concentration, an amino end group concentration, a molecular weight, a relative viscosity and a melt viscosity of polyamide in the reaction mixture using a near-infrared spectrometer during the polymerization process; and automatically and rapidly controlling the polycondensation reaction on the basis of the measured values.

As a result of extensive researches in view of the above objects, the inventors have found that a high-molecular polyamide with a batch-to-batch stability in its quality is produced by rapidly and accurately measuring properties of the polyamide being produced using a near-infrared spectrometer during the melt-polymerization process, and rapidly and accurately controlling the melt-polymerization conditions on the basis of the measured values. The present invention has been accomplished on the basis of this finding.

Thus, the present invention provides a process for producing a polyamide constituted of a dicarboxylic acid unit comprising 80% by mol or more of an aliphatic dicarboxylic acid unit having 6 to 12 carbon atoms and a diamine unit comprising 80% by mol or more of xylylenediamine unit or bisaminomethylcyclohexane unit, the process comprising (1) carrying out a melt-polymerization in batch-wise manner by adding a diamine monomer directly into a molten dicarboxylic acid monomer, thereby producing a polyamide; (2) measuring (A) a molar ratio of a diamine component and a dicarboxylic acid component in a reaction mixture, and (B) at least one property selected from the group consisting of a water content of the reaction mixture, and a carboxyl end group concentration, an amino end group concentration, a molecular weight, a relative viscosity and a melt viscosity of the polyamide obtained in the step (1) using a near-infrared spectrometer when a number average molecular weight of the polyamide obtained in the step (1) reaches 6000 to 20,000; and (3) regulating the molar ratio to a desired level and determining a time for further continuing the melt-polymerization on the basis of measured values (A) and (B), while continuing the melt-polymerization.

The present invention further provides a process for producing a polyamide constituted of a dicarboxylic acid unit comprising 80% by mol or more of an aliphatic dicarboxylic acid unit having 6 to 12 carbon atoms and a diamine unit comprising 80% by mol or more of xylylenediamine unit or bisaminomethylcyclohexane unit, the process comprising (1) carrying out a melt-polymerization in batch-wise manner by adding a diamine monomer directly into a molten dicarboxylic acid monomer, thereby producing a polyamide; (2) measuring (A) a molar ratio of a diamine component and a dicarboxylic acid component in a reaction mixture, and (B) at least one property selected from the group consisting of a water content of the reaction mixture, and a carboxyl end group concentration, an amino end group concentration, a molecular weight, a relative viscosity and a melt viscosity of the polyamide obtained in the step (1) using a near-infrared spectrometer when a number average molecular weight of the polyamide obtained in the step (1) reaches 6000 to 20,000; (3) regulating the molar ratio to a desired level or determining a time for further continuing the melt-polymerization on the basis of measured values (A) and (B), while continuing the melt-polymerization; (4) repeating the measurements (A) and (B) just before discharging a polyamide obtained in the step (3) from a melt-polymerization apparatus; and (5) controlling polymerization conditions of a subsequent melt-polymerization on the basis of measured valued (A) and (B) obtained in the step (4).

The present invention still further provides a process for producing a polyamide constituted of a dicarboxylic acid unit comprising 80% by mol or more of an aliphatic dicarboxylic acid unit having 6 to 12 carbon atoms and a diamine unit comprising 80% by mol or more of xylylenediamine unit or bisaminomethylcyclohexane unit, the process comprising (1) carrying out a melt-polymerization in batch-wise manner by adding a diamine monomer directly into a molten dicarboxylic acid monomer, thereby producing a polyamide; (2) measuring (A) a molar ratio of a diamine component and a dicarboxylic acid component in a reaction mixture, and (B) at least one property selected from the group consisting of a water content of the reaction mixture, and a carboxyl end group concentration, an amino end group concentration, a molecular weight, a relative viscosity and a melt viscosity of the polyamide obtained in the step (1) using a near-infrared spectrometer when a number average molecular weight of the polyamide obtained in the step (1) reaches 6000 to 20,000; (3) regulating the molar ratio to a desired level or determining a time for further continuing the melt-polymerization on the basis of measured values (A) and (B), while continuing the melt-polymerization; (4) repeating the measurements (A) and (B) just before discharging a polyamide obtained in the step (3) from a melt-polymerization apparatus, and solidifying the polyamide obtained in the step (3) by cooling; and (5) controlling polymerization conditions of a subsequent solid-phase polymerization on the basis of measured valued (A) and (B) obtained in the step (4).

DETAILED DESCRIPTION OF THE INVENTION

Figure 1:
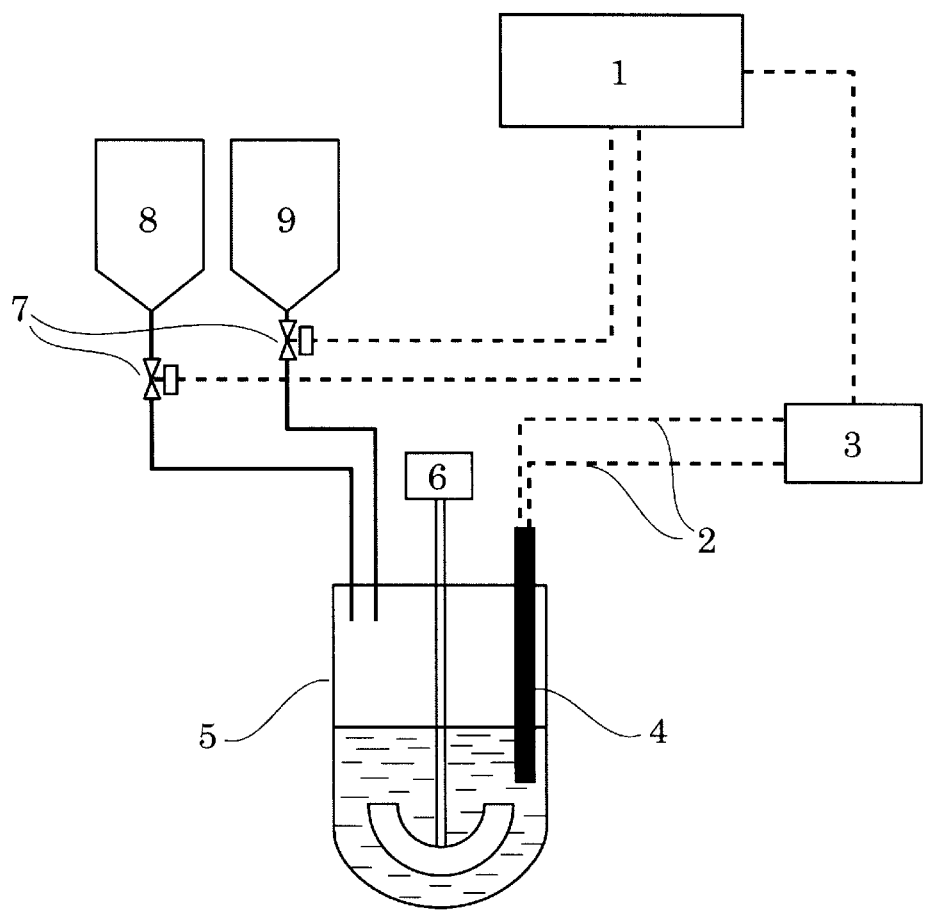
FIG. 1 is a flowsheet of a batch-wise melt-polymerization apparatus applicable to the polymerization process of the present invention.

The present invention will be explained in more detail.

The diamine monomer as a starting monomer for the polyamide contains 80 mol % or more of xylylenediamine, contains 80 mol % or more of bisaminomethylcyclohexane, or contains 80 mol % or more of xylylenediamine and bisaminomethylcyclohexane in total.

Xylylenediamine includes m-xylylenediamine, p-xylylenediamine and o-xylylenediamine. These xylylenediamines may be used alone or in combination of two or three. Xylylenediamine is preferred to contain m-xylylenediamine in an amount of 70 mol % or more for producing molding materials or packaging materials.

Bisaminomethylcyclohexane includes 1,2-bisaminomethylcyclohexane, 1,3-bisaminomethylcyclohexane and 1,4-bisaminomethylcyclohexane. These bisaminomethylcyclohexanes may be used alone or in combination of two or three. Bisaminomethylcyclohexane is preferred to contain 1,3-bisaminomethylcyclohexane in an amount of 70 mol % or more for producing molding materials or packaging materials.

Examples of the diamine monomer other than xylylenediamine and bisaminomethylcyclohexane include, but not limited to, (1) lactams such as caprolactam, valerolactam, laurolactam and undecanelactam; (2) aminocarboxylic acids such as 1,1-aminoundecanoic acid and 1,2-aminododecanoic acid; and (3) diamine such as trimethylenediamine, tetramethylenediamine, pentamethylenediamine, hexamethylenediamine, 1,7-diaminoheptane, 1,8-diaminooctane, 1,9-diaminononane, 1,10-diaminodecane, o-phenylenediamine, m-phenylenediamine and p-phenylenediamine.

The dicarboxylic acid monomer as another starting monomer for the polyamide contains a $C_6$–$C_{12}$ aliphatic dicarboxylic acid in an amount of 80 mol % or more. Examples of the $C_6$–$C_{12}$ aliphatic dicarboxylic acids include adipic acid, suberic acid and dodecanedioic acid. Of these $C_6$–$C_{12}$ aliphatic dicarboxylic acids, adipic acid is preferably used for producing molding materials or packaging materials. The dicarboxylic acid monomer other than the $C_6$–$C_{12}$ aliphatic dicarboxylic acids may include, but not limited to, isophthalic acid, terephthalic acid and 2,6-naphthalenedicarboxylic acid.

A phosphorus compound may be added to the polymerization system to accelerate the melt-polymerization and prevent the degradation of the resultant polyamide. The phosphorus compound may include phosphoric acid, phosphorous acid, hypophosphorous acid, and salts or esters thereof. Examples of the phosphoric salt include potassium phosphate, sodium phosphate, calcium phosphate, magnesium phosphate, manganese phosphate, nickel phosphate, and cobalt phosphate. Examples of the phosphoric ester include methyl phosphate, ethyl phosphate, isopropyl phosphate, butyl phosphate, hexyl phosphate, isodecyl phosphate, decyl phosphate, stearyl phosphate and phenyl phosphate. Examples of the phosphorous salt include potassium phosphite, sodium phosphite, calcium phosphite, magnesium phosphite, manganese phosphite, nickel phosphite, and cobalt phosphite. Examples of phosphorous ester include methyl phosphite, ethyl phosphite, isopropyl phosphite, butyl phosphite, hexyl phosphite, isodecyl phosphite, decyl phosphite, stearyl phosphite and phenyl phosphite. Examples of the hypophosphorous salt include potassium hypophosphite, sodium hypophosphite, calcium hypophosphite, magnesium hypophosphite, manganese hypophosphite, nickel hypophosphite and cobalt hypophosphite. Examples of the hypophosphorous ester include methyl hypophosphite, ethyl hypophosphite, isopropyl hypophosphite, butyl hypophosphite, hexyl hypophosphite, isodecyl hypophosphite, decyl hypophosphite, stearyl hypophosphite and phenyl hypophosphite. These phosphorus compounds may be used alone or in combination of two or more.

The phosphorus compound may be added to an aqueous solution of nylon salt as a starting material for the polyamide, added to the diamine monomer or the dicarboxylic acid monomer, or added to a polymerization system during the melt-polymerization, although not limited thereto.

A batch-wise melt-polymerization apparatus (first melt-polymerization apparatus) usable in the present invention for conducting the melt-polymerization by directly adding the diamine monomer to the molten dicarboxylic acid monomer is not particularly restricted as far as it is structurally acceptable for use as a polymerization apparatus. If a later stage of the melt-polymerization is carried out under reduced pressure to proceed the polymerization efficiently, a pressure-resistant polymerization apparatus is preferably used.

A melt-polymerization apparatus (second polymerization apparatus) for conducting a subsequent melt-polymerization of the polyamide from the first melt-polymerization apparatus to increase its molecular weight is not particularly restricted, and may be either a batch-wise polymerization apparatus or a continuous polymerization apparatus as far as it is structurally acceptable for use as a polymerization apparatus. Since the subsequent melt-polymerization is preferably carried out under reduced pressure to proceed the polymerization efficiently, a pressure-resistant polymerization apparatus is preferably used. In addition, the second melt-polymerization apparatus is preferably equipped with an agitating blade or screw which capable of efficiently agitating or forcing out a highly viscous polyamide at a later stage of the polymerization.

The subsequent polymerization for increasing the molecular weight of the polyamide from the first melt-polymerization apparatus may be conducted by a solid-phase polymerization. The polymerization apparatus for the solid-phase polymerization is not particularly restricted, and may be either a batch-wise polymerization apparatus or a continuous polymerization apparatus as far as it is structurally acceptable for use as a polymerization apparatus. Examples of the batch-wise solid-phase polymerization apparatus include a rotary drum-type heating apparatus called as a tumble dryer, a conical dryer or a rotary dryer; and a conical heating apparatus having an inner rotary blade, e.g., a so-called Nauta mixer. Examples of the continuous solid-phase polymerization apparatus include a hopper-type continuous solid-phase polymerization apparatus employing heated dry nitrogen.

In the present invention, the batch-wise melt-polymerization by adding the diamine monomer directly into the molten dicarboxylic acid monomer can be carried out in either the presence or the absence of a solvent. In view of easy control of the polymerization reaction, the polymerization is preferably carried out in the absence of a solvent.

In the batch-wise melt-polymerization by adding the diamine monomer directly into the dicarboxylic acid monomer, the temperature of the reaction system should be maintained at a temperature not lower the melting point of polyamide. However, since excessively high temperatures are likely to cause undesired discoloration of the polyamide due to its thermal degradation, the batch-wise melt-polymerization is carried out at temperatures selected from 170 to 280° C. The melt-polymerization time may be determined so that the polyamide reaches an intended molecular weight, and is preferably 30 min or longer in the polymerization temperature range of 170 to 280° C.

The subsequent batch-wise or continuous melt-polymerization of the polyamide from the first melt-polymerization apparatus is carried out at temperatures not lower than the melting point of the polyamide, preferably at temperatures selected from the range of (melting point +5° C.) to 290° C. The polymerization time and pressure are determined so that the polyamide reaches an intended molecular weight. To reduce the polymerization time, the pressure is preferably maintained at low level.

The subsequent batch-wise or continuous solid-phase polymerization of the polyamide from the first melt-polymerization apparatus is carried out at temperatures lower than the melting point of the polyamide, preferably at temperatures selected from the range of 130° C. to (melting point −20° C.). The polymerization time is determined so that the polyamide reaches an intended molecular weight. To reduce the polymerization time, the polymerization pressure is maintained at low level or dry nitrogen is made to flow.

Since the near-infrared spectroscopy is a relative analysis method, it is necessary, before applying to actual polymerization process, to prepare in advance a calibration model and a calibration curve to correlate the near-infrared spectra and the properties of polyamide. In the present invention, near-infrared spectra of 15 or more samples, preferably 20 or more samples are taken using a near-infrared spectrometer. Separately, the properties of polyamide are measured on the same samples by a direct analysis method. Then, the measured properties and the near-infrared spectra are analyzed by a multivariate analysis such as multi-linear regression analysis and partial least squares analysis to establish the correlation between the properties and the near-infrared spectra, thereby obtaining the calibration curve. The multivariate analysis may be done using a commercially available chemometrics software.

In the process of the present invention, the molten polyamide produced in the melt-polymerization is irradiated with a near-infrared radiation from a near-infrared spectrometer. By analyzing the obtained near-infrared spectra and the calibration model and the calibration curve prepared in advance using an analyzer, various properties such as molar ratio of monomer components, molecular weight, relative viscosity and melt viscosity are calculated. On the basis of the calculated results, the molar ratio of the monomer components in the polymerization process is adjusted as desired, and the timing for changing the polymerization process and the end point of the polymerization reaction are determined.

The near-infrared spectrometer used in the present invention is not particularly restricted as far as it is capable of measuring spectra ranging from 700 nm to 2,500 nm, and is provided with an analyzer for multivariate analysis of the measured spectra. The analyzer may be built in the near-infrared spectrometer or may be remote from the near-infrared spectrometer if connected on-line to the near-infrared spectrometer. The spectroscopic method is not particularly restricted, and may employ a diffraction grating method, a Fourier transformation method and an acousto-optic spectroscopic method. The noise level of the near-infrared spectrometer is preferably $80 \times 10^{-6}$ Abs (absolute value) or lower. When the noise level is more than $80 \times 10^{-6}$ Abs, the accuracy of measurement is likely to be reduced.

Measuring terminals such as probes and cells for irradiating the polyamide with near-infrared radiation may be placed at appropriate positions in the reaction system. The measuring terminals may be placed by any suitable manner. For example, the measuring terminals may be directly placed in the melt-polymerization apparatus, or may be placed in a bypass for external circulation provided to the melt-polymerization apparatus.

The measuring terminals are connected to the near-infrared spectrometer through optical fibers. The molten polyamide is irradiated with the near-infrared radiation through optical fibers, and irradiation transmitted through the polyamide is introduced into a detector through optical fibers. With such an arrangement, the energy loss of the near-infrared radiation is minimized and a remote control of the near-infrared spectrometer becomes possible because the near-infrared spectrometer can be located apart from the measuring terminals.

The near-infrared spectra obtained by the above method are subjected to multivariate analysis using an analyzer, thereby measuring properties of the polyamide in real time. Thus, since the properties of the polyamide during the polymerization process are monitored in real time and on-line, the polymerization conditions are rapidly controlled against various external factors which affect the polymerization conditions.

In the present invention, (A) the molar ratio of the diamine component and the dicarboxylic acid component in the reaction mixture and (B) at least one property selected from the water content of the reaction mixture, and the carboxyl end group concentration, the amino end group concentration, the molecular weight, the relative viscosity and the melt viscosity of the polyamide are measured using the near-infrared spectrometer during the polymerization process. As noted above, the diamine component includes both the diamine monomer remaining in the reaction mixture not polymerized and the diamine monomer polymerized to constitute the polyamide. Similarly, the dicarboxylic acid component includes both the dicarboxylic acid monomer remaining in the reaction mixture not polymerized and the dicarboxylic acid monomer polymerized to constitute the polyamide. Namely, the diamine component is the same as the initial charge of the diamine monomer, and the dicarboxylic acid component is the same as the initial charge of the dicarboxylic acid component.

The increasing rate of the molecular weight of polyamide depends on the molar ratio of the monomer components. Therefore, the increasing rate of the molecular weight is adequately controlled by adjusting the molar ratio within intended range on the basis of the measurement of (A) the molar ratio of the charged diamine monomer and the charged dicarboxylic acid monomer.

By the information about the water content of the reaction mixture, the carboxyl end group concentration, the amino end group concentration, the molecular weight, the relative viscosity and the melt viscosity, it can be made sure whether the polyamide reaches a desired polymerization degree. Therefore, the timing for changing the polymerization conditions and the end point of the polymerization is exactly judged on the basis of the measurement of at least one of the properties (B).

By controlling the molar ratio of the monomer components in the reaction mixture and by determining the timing for changing the polymerization conditions and the end point of the polymerization on the basis of the measured values (A) and (B), it is possible to stably produce the polyamide having a desired quality.

In the batch-wise melt-polymerization by adding the diamine monomer directly into the molten dicarboxylic acid monomer, the measurement of the properties of polyamide by the near-infrared spectroscopy is taken preferably at the stage where the molecular weight of polyamide reaches 6000 to 20000. By measuring at such a stage, the molar ratio of the monomer components in the reaction mixture is adequately controlled and the time for further continuing the melt-polymerization can be easily determined. To produce the polyamide having a molecular weight within the above range, it is required to enhance the increasing speed of the molecular weight by adjusting the molar ratio of the monomer components to about 1. With such a molar ratio, it generally becomes more difficult to determine the timing for changing the polymerization conditions and the end point of the polymerization. However, in the present invention, the molar ratio and the degree of polymerization are rapidly and easily controlled by the near-infrared spectroscopy.

When the polyamide from the above batch-wise melt-polymerization is further subjected to polymerization in a different polymerization apparatus, the near-infrared spectroscopic measurement of the properties of polyamide is again conducted before discharging the polyamide from the batch-wise polymerization apparatus to determine the polymerization conditions such as residence time, temperature and pressure of the next polymerization. The molecular weight of the polyamide being discharge is, but not specifically limited to, preferably 12000 to 25000 in consideration of the measuring accuracy of the near-infrared spectrometer and the easiness of subsequent handing.

In the batch-wise melt-polymerization by adding the diamine monomer directly into the molten dicarboxylic acid monomer, it is very important that the measurement of the properties of polyamide in the reaction system by the near-infrared spectroscopy is carried out in the absence of heterogeneous phase such as bubbles. To avoid the detrimental influence of bubbles, it is preferred that the reaction system is maintained after completing the addition of the diamine monomer over at least 5 min without reducing a vapor phase pressure applied to the molten polyamide, the vapor phase pressure is then increased by 5 kPa or more, and then the near-infrared spectroscopic measurement is conducted. Alternatively, it is preferred that the reaction system is maintained after completing the addition of the diamine monomer over at least 5 min without reducing the vapor phase pressure applied to the molten polyamide, the reaction system is then maintained over at least one minute after reducing the vapor phase pressure by 10 kPa or more, the vapor phase pressure is then increased by 5 kPa or more, and then the near-infrared spectroscopic measurement is conducted. By operating as mentioned above, the bubbles in the reaction system are effectively removed, thereby enabling the accurate measurement by the near-infrared spectroscopy.

In addition, the influence of bubbles attributable to the condensation water generated in the reaction system by the gravity of the reaction liquid can be minimized by carrying out the near-infrared spectroscopic measurement using the measuring means which is placed ⅕ or more of the diameter of polymerization apparatus under the still surface of the reaction mixture at least after 5 min from the completion of adding the diamine monomer.

Referring to the attached drawings, the present invention will be further explained. In the batch-wise melt-polymerization as shown in FIG. 1, the molar ratio of the monomer components is controlled as follows. A measuring terminal 4 of a near-infrared spectrometer 3 is disposed within a batch-wise melt-polymerization apparatus 5 equipped with an agitating means 6. The molten polyamide during the polymerization process is continuously irradiated with the near-infrared radiation from the measuring terminal 4. The transmitted near-infrared radiation is introduced into the near-infrared spectrometer 3 through an optical fiber 2, and detected by a detector built in the near-infrared spectrometer 3 to obtain near-infrared spectra. The near-infrared spectra are analyzed by an analyzer built in the near-infrared spectrometer 3 to determine the molar ratio of the monomer components in the reaction mixture. The determined molar ratio is transmitted to a control computer 1 to control the molar ratio to the intended level by feedback control of each feed controller 7 of a diamine tank 8 and a dicarboxylic acid tank 9.

The molecular weight of the polyamide in the batch-wise melt-polymerization as shown in FIG. 1 is controlled as follows. First, the molecular weight of the polyamide is determined by analyzing the obtained near-infrared spectra using the analyzer built in the near-infrared spectrometer 3. The determined molecular weight of the polyamide is transmitted to the control computer 1 where the time required until the molecular weight reaches the intended level is computed, thereby determining the end point of the polymerization to control the molecular weight.

In the continuous melt-polymerization shown in FIG. 2, the molar ratio of the monomer components is controlled as follows. A measuring terminal 4 of a near-infrared spectrometer 3 is disposed at an outlet of an initial-stage polymerization apparatus 5 equipped with an agitator 6. A molten polyamide passing through the outlet is continuously irradiated with the near-infrared radiation from the measuring terminal 4. The transmitted near-infrared radiation is introduced into the near-infrared spectrometer 3 through an optical fiber 2, and detected by a detector built in the near-infrared spectrometer 3 to obtain near-infrared spectra, which are analyzed by an analyzer built in the near-infrared spectrometer 3 to determine the molar ratio of the monomer components. The determined molar ratio is transmitted to a control computer 1 to control the molar ratio to the intended level by a feedback control of each feed controller 7 of a diamine tank 8 and a dicarboxylic acid tank 9 and a feedforward control of each feed controller 12 of molar ratio-regulating tanks 10 and 11, each being connected to an intermediate-stage polymerization apparatus 14 equipped with an agitator 6.

Figure 2:
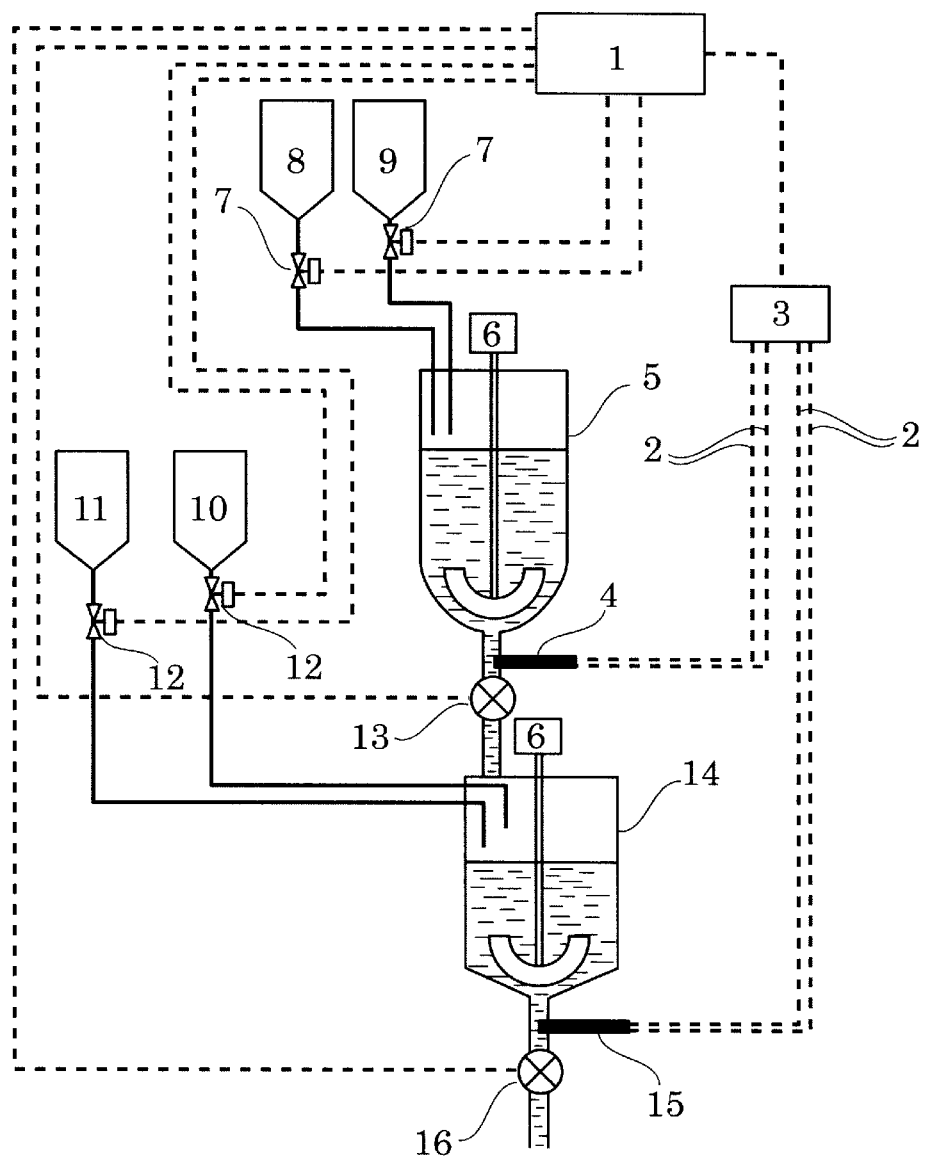
FIG. 2 is a flowsheet of a continuous melt-polymerization apparatus applicable to the polymerization process of the present invention.

The molecular weight of the polyamide in the continuous melt-polymerization as shown in FIG. 2 is controlled as follows. First, the near-infrared spectra measured by the measuring terminal 4 of the near-infrared spectrometer 3 which is disposed at the outlet of the initial-stage polymerization apparatus 5 is analyzed to determine a molecular weight of the polyamide passing through the outlet. The determined molecular weight is transmitted to the control computer 1 which feedforward controls a feed pump 13 on the basis of the transmitted molecular weight. Similarly, the molecular weight of the polyamide produced in the intermediate-stage polymerization apparatus 14 is measured by a measuring terminal 15 of the near-infrared spectrometer 3 which is disposed at outlet of the intermediate-stage polymerization apparatus 14. On the basis of the measured molecular weight, a feed pump 16 is controlled in feedforward manner. Thus, by controlling the feed pumps to regulate the residence time in each polymerization apparatus, the molecular weight of the polyamide is controlled to the intended level. When the molecular weight of the polyamide produced in the intermediate-stage polymerization apparatus 14 does not reach the intended level, the polymerization may be further continued in an additional late-stage polymerization apparatus (not shown). In such a case, the reaction conditions in the late-stage polymerization apparatus are feedforward controlled on the basis of the properties of the polyamide measured by the measuring terminal 15.

The present invention will be explained in more detail by reference to the following example which should not be construed to limit the scope of the present invention. In the following examples, measurements and analyses were conducted by the following methods.

(1) Near-Infrared Spectra

The near-infrared spectra were measured using a near-infrared spectrometer "InSite IV" available from UOP Guided Wave Corp., and a measuring terminal "Single-Sided Transmission Probe (SST probe) available from the same company. The near-infrared spectrometer and the measuring terminal were connected with each other through optical fibers. The measuring terminal was inserted into the melt-polymerization apparatus to scan the spectrum nine times, thereby measuring the near-infrared spectra.

(2) Multivariate Analysis of Near-Infrared Spectra

The near-infrared spectra within the range of 1,050 to 2,100 nm which are related to properties of polyamide were analyzed by multi-linear regression analysis and partial least squares analysis using a chemometrics software "The Unscrambler" available from Camo Corp.

(3) Amino End Group Concentration

Into 30 mL of a mixed solvent of phenol and ethanol (4:1 by volume), was dissolved 0.3 to 0.5 g of accurately weighed polyamide under stirring. After completely dissolving, the resultant solution was subjected to neutralization titration using a 0.01 mol/L hydrochloric acid under stirring to determine the amino end group concentration.

(4) Carboxyl End Group Concentration

Into 30 mL of benzyl alcohol, was dissolved 0.3 to 0.5 g of accurately weighed polyamide at 160 to 180° C. under stirring in nitrogen flow. After completely dissolving, the resultant solution was cooled to 80° C. in nitrogen flow and mixed with 10 mL of methanol under stirring, followed by neutralization titration using a 0.01 mol/L sodium hydroxide aqueous solution to determine the carboxyl end group concentration.

(5) Molar Ratio of Charged Monomers

Calculated from the correlation between the amino end group concentration, the carboxyl end group concentration and the conversion of the amino end group.

(6) Number-Average Molecular Weight

Calculated from the determined values of the titration of the amino end group and the carboxyl end group according to the following equation:

Number-average molecular weight=$2/([NH_2]+[COOH])$ wherein $[NH_2]$ is the amino end group concentration (mol/g) and $[COOH]$ is the carboxyl end group concentration (mol/g).

EXAMPLE 1

(1) Preparation of Calibration Model and Calibration Curve

Figure 3:
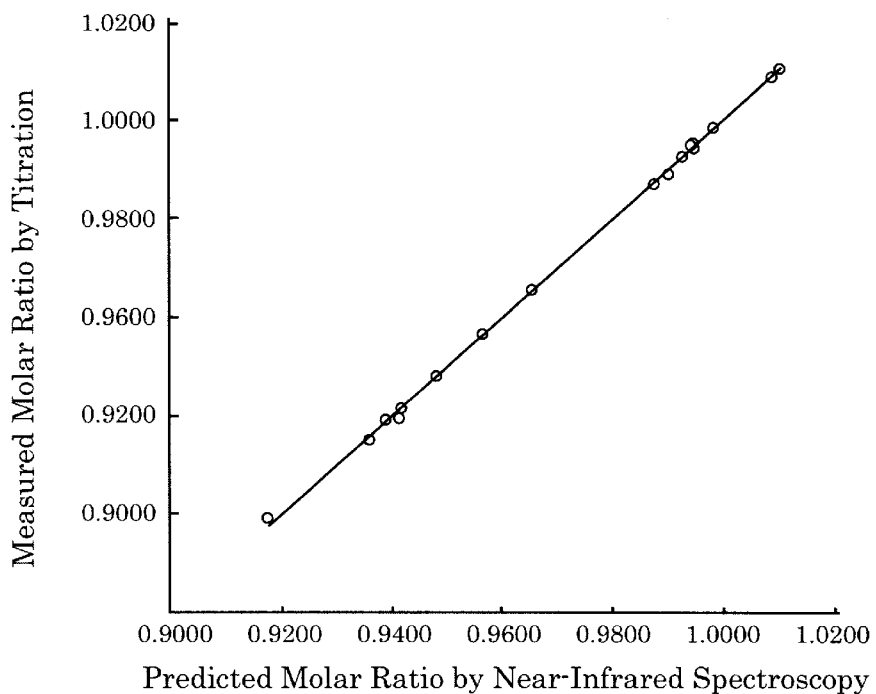
FIG. 3 is a calibration curve showing the relationship between the actual molar ratios measured by titration analysis and the predicted molar ratios obtained by a near-infrared spectroscopy, for determining the molar ratio of the charged starting monomers, a diamine monomer and a dicarboxylic acid monomer, in a reaction mixture.
Figure 4:
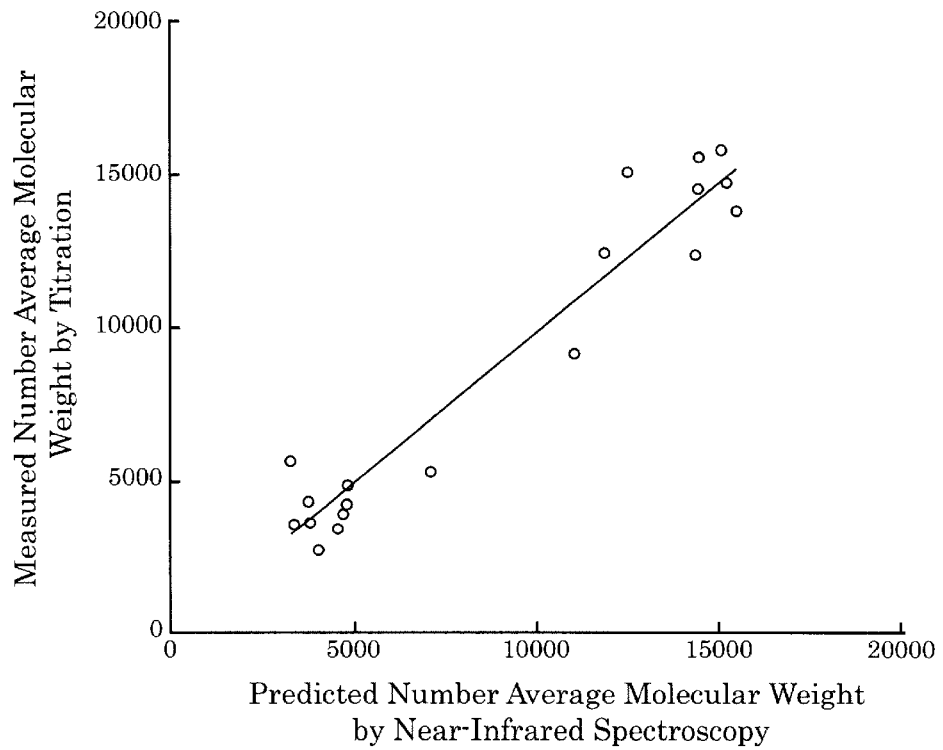
FIG. 4 is a calibration curve showing the relationship between the actual number-average molecular weights measured by titration analysis and the predicted number-average molecular weights obtained by a near-infrared spectroscopy, for determining the number-average molecular weight of polyamide in the reaction mixture.

An SST probe was directly inserted into a polymerization apparatus, where poly(m-xylylene adipamide) (hereinafter referred to merely as "nylon MXD6") was produced by a batch-wise melt-polymerization, to measure near-infrared spectra of the molten polyamide with the passage of time 2 to 4 times for each batch. Immediately after every measurement, the reaction mixture was sampled and subjected to titration analysis to determine an amino end group concentration, a carboxyl end group concentration, a molar ratio of monomer components, and a number-average molecular weight. The above sampling procedure was repeated for 11 batches to obtain 26 data set for preparing the calibration curve. The near-infrared spectra of each specimen and its corresponding results of titration analysis were analyzed by a partial least squares analysis to prepare provisional calibration model and calibration curve. After the specimen which was less related to the calibration curve was omitted as an outlier, all of the remaining specimens were subjected again to the above analysis to prepare a calibration model and a calibration curve. The calibration curves for the molar ratio of monomer components and the number-average molecular weight, which correlate the predicted values based on the near-infrared spectra and the measured values based on the titration, are shown in FIGS. 3 and 4. The correlation coefficient and the standard error of prediction (SEP) of the calibration curve are respectively 0.9997 and 0.00076 for the molar ratio of monomer components, and respectively 0.9612 and 1456 for the number average molecular weight. Each calibration curve shows that there is a definite correlation between the predicted values and the measured values.

(2) Melt-Polymerization

The synthesis of nylon MXD6 was carried out in a batch-wise melt-polymerization apparatus as shown in FIG. 1. At a point after a mid-stage of the polymerization process where the number average molecular weight of the polyamide reached 7,000 or more, the molten polyamide was irradiated with near-infrared radiation to measure near-infrared spectra. Using the infrared spectra thus measured and the calibration model and calibration curve prepared in advance, the molar ratio and the number-average molecular weight of the polyamide were measured. On the basis of the measured values, the amount of diamine monomer or dicarboxylic acid monomer to be added and a reaction time required were calculated so that the objective molar ratio of monomer components and number average molecular weight can be attained, while continuing the polymerization.

The time required from the initiation of measurement using the near-infrared spectrometer to completion of the calculation of the amount of the monomer to be added and the reaction time was within 3 min. Thus, the molar ratio and the number average molecular weight were rapidly controlled. The number average molecular weight of the resultant polyamide after polymerization was 15,000.

EXAMPLE 2

The polymerization reaction was carried out in the same manner as in Example 1 except for using bisaminomethylcyclohexane instead of m-xylylenediamine.

At a point after a mid-stage of the polymerization process where the number average molecular weight of the polyamide reached 7,000 or more, the molten polyamide was irradiated with near-infrared radiation to measure near-infrared spectra. Using the infrared spectra thus measured and the calibration model and calibration curve prepared in advance, the molar ratio and the number-average molecular weight of the polyamide were measured. On the basis of the measured values, the amount of diamine monomer or dicarboxylic acid monomer to be added and a reaction time required were calculated so that the objective molar ratio of monomer components and number average molecular weight can be attained, while continuing the polymerization. The time required from the initiation of measurement using the near-infrared spectrometer to completion of the calculation of the amount of the monomer to be added and the reaction time was within 3 min. Thus, the molar ratio and the number average molecular weight were rapidly controlled. The number average molecular weight of the resultant polyamide after polymerization was 14,500.

The reaction conditions of the melt-polymerization for preparing polyamide are automatically and rapidly controlled by accurately measuring properties of the polyamide being produced using a near-infrared spectrometer in real time during the polymerization process. Since an objective polyamide is produced highly efficiently with a good stability in quality, the process of the present invention is industrially useful for producing polyamide.

What is claimed is:

1. A process for producing a polyamide constituted of a dicarboxylic acid unit comprising 80% by mol or more of an aliphatic dicarboxylic acid unit having 6 to 12 carbon atoms and a diamine unit comprising 80% by mol or more of xylylenediamine unit or bisaminomethylcyclohexane unit, the process comprising:

(1) performing a melt-polymerization in batch-wise manner by adding a diamine monomer directly into a molten dicarboxylic acid monomer, thereby producing a polyamide;

(2) measuring, in the absence of bubbles, (A) a molar ratio of a diamine component and a dicarboxylic acid component in a reaction mixture, and (B) at least one property selected from the group consisting of a water content of the reaction mixture, and a carboxyl end group concentration, an amino end group concentration, a molecular weight, a relative viscosity and a melt viscosity of the polyamide obtained in the step (1) using a near-infrared spectrometer when a number average molecular weight of the polyamide obtained in the step (1) reaches 6000 to 20,000, the diamine component including the diamine monomer remaining in the reaction mixture not polymerized and the diamine monomer polymerized to constitute the polyamide obtained in the step (1), and the dicarboxylic acid component including the dicarboxylic acid monomer remaining in the reaction mixture not polymerized and the dicarboxylic acid monomer polymerized to constitute the polyamide obtained in the step (1); and (3) regulating the molar ratio to a desired level and determining a time for further continuing the melt-polymerization and the timing for changing the polymerization conditions on the basis of measured values (A) and (B), while continuing the melt-polymerization.

2. The process according to claim 1, wherein xylylenediamine contains m-xylylenediamine in an amount of 70 mol % or higher.

3. The process according to claim 1, wherein bisaminomethylcyclohexane contains 1,3-bisaminomethylcyclohexane in an amount of 70 mol % or higher.

4. The process according to claim 1, wherein the $C_6$–$C_{12}$ aliphatic dicarboxylic acid is adipic acid.

5. The process according to claim 1, wherein the melt-polymerization in the step (1) is performed in the absence of a solvent.

6. The process according to claim 1, wherein the polyamide produced in the step (3) has a molecular weight of 12,000 to 25,000.

7. The process according to claim 1, wherein a reaction system of the melt-polymerization in the step of (1) is maintained after completing the addition of the diamine monomer for at least 5 min without reducing a vapor phase pressure applied to a molten polyamide, the vapor phase pressure is then increased by 5 kPa or more, and then the near-infrared spectroscopic measurement of the step (2) is conducted.

8. The process according to claim 1, wherein a reaction system of the melt-polymerization in the step of (1) is maintained after completing the addition of the diamine monomer for at least 5 min without reducing the vapor phase pressure applied to the molten polyamide, the reaction system is then maintained for at least one minute after reducing the vapor phase pressure by 10 kPa or more, the vapor phase pressure is then increased by 5 kPa or more, and then the near-infrared spectroscopic measurement of the step (2) is conducted.

9. A process for producing a polyamide constituted of a dicarboxylic acid unit comprising 80% by mol or more of an aliphatic dicarboxylic acid unit having 6 to 12 carbon atoms and a diamine unit comprising 80% by mol or more of xylylenediamine unit or bisaminomethylcyclohexane unit, the process comprising:

(1) performing a melt-polymerization in batch-wise manner by adding a diamine monomer directly into a molten dicarboxylic acid monomer, thereby producing a polyamide;

(2) measuring, in the absence of bubbles, (A) a molar ratio of a diamine component and a dicarboxylic acid component in a reaction mixture, and (B) at least one property selected from the group consisting of a water content of the reaction mixture, and a carboxyl end group concentration, an amino end group concentration, a molecular weight, a relative viscosity and a melt viscosity of the polyamide obtained in the step (1) using a near-infrared spectrometer when a number average molecular weight of the polyamide obtained in the step (1) reaches 6000 to 20,000, the diamine component including the diamine monomer remaining in the reaction mixture not polymerized and the diamine monomer polymerized to constitute the polyamide obtained in the step (1), and the dicarboxylic acid component including the dicarboxylic acid monomer remaining in the reaction mixture not polymerized and the dicarboxylic acid monomer polymerized to constitute the polyamide obtained in the step (1);

(3) regulating the molar ratio to a desired level or determining a time for further continuing the melt-polymerization and the timing for changing the polymerization conditions on the basis of measured values (A) and (B), while continuing the melt-polymerization;

(4) repeating the measurements (A) and (B) just before discharging a polyamide obtained in the step (3) from a melt-polymerization apparatus; and (5) controlling polymerization conditions of a subsequent melt-polymerization on the basis of measured values (A) and (B) obtained in the step (4).

10. The process according to claim 9, wherein the subsequent melt-polymerization is performed in a batch-wise manner or a continuous manner.

11. The process according to claim 9, wherein xylylenediamine contains m-xylylenediamine in an amount of 70 mol % or higher.

12. The process according to claim 9, wherein bisaminomethylcyclohexane contains 1,3-bisaminomethylcyclohexane in an amount of 70 mol % or higher.

13. The process according to claim 9, wherein the $C_6$–$C_{12}$ aliphatic dicarboxylic acid is adipic acid.

14. The process according to claim 9, wherein the melt-polymerization in the step (1) is performed in the absence of a solvent.

15. The process according to claim 9, wherein the polyamide produced in the step (3) has a molecular weight of 12,000 to 25,000.

16. The process according to claim 9, wherein a reaction system of the melt-polymerization in the step of (1) is maintained after completing the addition of the diamine monomer for at least 5 min without reducing a vapor phase pressure applied to a molten polyamide, the vapor phase pressure is then increased by 5 kPa or more, and then the near-infrared spectroscopic measurement of the step (2) is conducted.

17. The process according to claim 9, wherein a reaction system of the melt-polymerization in the step of (1) is maintained after completing the addition of the diamine monomer for at least 5 min without reducing the vapor phase pressure applied to the molten polyamide, the reaction system is then maintained for at least one minute after reducing the vapor phase pressure by 10 kPa or more, the vapor phase pressure is then increased by 5 kPa or more, and then the near-infrared spectroscopic measurement of the step (2) is conducted.

18. A process for producing a polyamide constituted of a dicarboxylic acid unit comprising 80% by mol or more of an aliphatic dicarboxylic acid unit having 6 to 12 carbon atoms and a diamine unit comprising 80% by mol or more of xylylenediamine unit or bisaminomethylcyclohexane unit, the process comprising:

(1) performing a melt-polymerization in batch-wise manner by adding a diamine monomer directly into a molten dicarboxylic acid monomer, thereby producing a polyamide;

(2) measuring, in the absence of bubbles, (A) a molar ratio of a diamine component and a dicarboxylic acid component in a reaction mixture, and (B) at least one property selected from the group consisting of a water content of the reaction mixture, and a carboxyl end group concentration, an amino end group concentration, a molecular weight, a relative viscosity and a melt viscosity of the polyamide obtained in the step (1) using a near-infrared spectrometer when a number average molecular weight of the polyamide obtained in the step (1) reaches 6000 to 20,000, the diamine component including the diamine monomer remaining in the reaction not polymerized and the diamine monomer polymerized to constitute the polyamide obtained in the step (1), and the dicarboxylic acid component including the dicarboxylic acid monomer remaining in the reaction mixture not polymerized and the dicarboxylic acid monomer polymerized to constitute the polyamide obtained in the step (1);

(3) regulating the molar ratio to a desired level or determining a time for further continuing the melt-polymerization and the timing for changing the polymerization conditions on the basis of measured values (A) and (B), while continuing the melt-polymerization;

(4) repeating the measurements (A) and (B) just before discharging a polyamide obtained in the step (3) from a melt-polymerization apparatus, and solidifying the polyamide obtained in the step (3) by cooling; and (5) controlling polymerization conditions of a subsequent solid-phase polymerization on the basis of measured values (A) and (B) obtained in the step (4).

19. The process according to claim 18, wherein the subsequent solid-phase polymerization is performed in a batch-wise manner or a continuous manner.

20. The process according to claim 18, wherein xylylenediamine contains m-xylylenediamine in an amount of 70 mol % or higher.

21. The process according to claim 18, wherein bisaminomethylcyclohexane contains 1,3-bisaminomethylcyclohexane in an amount of 70 mol % or higher.

22. The process according to claim 18, wherein the $C_6$–$C_{12}$ aliphatic dicarboxylic acid is adipic acid.

23. The process according to claim 18, wherein the melt-polymerization in the step (1) is performed in the absence of a solvent.

24. The process according to claim 18, wherein the polyamide produced in the step (3) has a molecular weight of 12,000 to 25,000.

25. The process according to claim 18, wherein a reaction system of the melt-polymerization in the step of (1) is maintained after completing the addition of the diamine monomer for at least 5 min without reducing a vapor phase pressure applied to a molten polyamide, the vapor phase pressure is then increased by 5 kPa or more, and then the near-infrared spectroscopic measurement of the step (2) is conducted.

26. The process according to claim 18, wherein a reaction system of the melt-polymerization in the step of (1) is maintained after completing the addition of the diamine monomer for at least 5 min without reducing the vapor phase pressure applied to the molten polyamide, the reaction system is then maintained for at least one minute after reducing the vapor phase pressure by 10 kPa or more, the vapor phase pressure is then increased by 5 kPa or more, and then the near-infrared spectroscopic measurement of the step (2) is conducted.

27. The process according to claim 1, wherein the melt-polymerization is performed in the presence of a phosphorous compound.

28. The process according to claim 27, wherein said phosphorous compound is selected from the group consisting of phosphoric acid, phosphorous acid, hypophosphorous acid, and salts and esters thereof.

29. The process according to claim 1, wherein said near-infrared spectrometer is one which can measure spectra ranging from 700 nm to 2,500 nm and is provided with an analyzer for multivariate analysis of the measured spectra.

30. The process according to claim 1, wherein a measuring terminal of the near-infrared spectrometer is located at least ⅕ of the diameter, of a polymerization apparatus in which the melt-polymerization is performed, under a still surface of the reaction mixture of the melt-polymerization, at least after 5 minutes from the completion of adding the diamine monomer.

31. The process according to claim 9, wherein a measuring terminal of the near-infrared spectrometer is located at least ⅕ of the diameter, of a polymerization apparatus in which the melt-polymerization is performed, under a still surface of the reaction mixture of the melt-polymerization, at least after 5 minutes from the completion of adding the diamine monomer.

32. The process according to claim 19, wherein a measuring terminal of the near-infrared spectrometer is located at least ⅕ of the diameter, of a polymerization apparatus in which the melt-polymerization is performed, under a still surface of the reaction mixture of the melt-polymerization, at least after 5 minutes from the completion of adding the diamine monomer.

* * * * *